United States Patent [19]
Ogata

[11] Patent Number: 6,099,969
[45] Date of Patent: Aug. 8, 2000

[54] MULTIFUNCTIONAL COATING AGENT

[75] Inventor: Shiro Ogata, Tokyo, Japan

[73] Assignee: Tao, Inc., Tokyo, Japan

[21] Appl. No.: 09/171,180

[22] PCT Filed: Feb. 20, 1998

[86] PCT No.: PCT/JP98/00704

§ 371 Date: Oct. 14, 1998

§ 102(e) Date: Oct. 14, 1998

[87] PCT Pub. No.: WO98/37153

PCT Pub. Date: Aug. 27, 1998

[30] Foreign Application Priority Data

Feb. 24, 1997 [JP] Japan ..................................... 9-038898

[51] Int. Cl.[7] ................................ B32B 9/00; C09C 1/36
[52] U.S. Cl. ........................ 428/432; 428/325; 428/472; 428/701; 428/702; 106/436; 106/437
[58] Field of Search .................... 428/701, 702, 428/432, 472, 325; 106/287.19, 436, 437, 447

[56] References Cited

U.S. PATENT DOCUMENTS

| | | | |
|---|---|---|---|
| 5,399,435 | 3/1995 | Ando | 428/428 |
| 5,413,865 | 5/1995 | Nakamura | 428/432 |
| 5,514,485 | 5/1996 | Ando | 428/702 |
| 5,770,310 | 6/1998 | Noguchi | 428/403 |
| 5,840,111 | 11/1998 | Wiederhoft | 106/436 |

FOREIGN PATENT DOCUMENTS

| | | |
|---|---|---|
| 63-215520 | 9/1988 | Japan . |
| 6-321550 | 11/1994 | Japan . |
| 8-309835 | 11/1996 | Japan . |
| 9-019976 | 1/1997 | Japan . |
| 9-030933 | 2/1997 | Japan . |
| 9-048716 | 2/1997 | Japan . |
| 9-262481 | 10/1997 | Japan . |

OTHER PUBLICATIONS

Hitoshi Ando, *Frangrance J.*, vol. 25, 1997, pp. 65–73 (American Chemical Society Abstract).

*Primary Examiner*—Timothy M. Speer
*Assistant Examiner*—Bryant Young
*Attorney, Agent, or Firm*—Venable; Robert Kinberg

[57] ABSTRACT

A coating agent including amorphous titanium peroxide. Preferably, the amorphous titanium peroxide is a sol. Additionally, a coated substrate includes a substrate; and a coating provided on at least one surface of the substrate and comprised of the coating agent.

20 Claims, No Drawings

MULTIFUNCTIONAL COATING AGENT

BACKGROUND OF THE INVENTION

1. Field of the Invention

The present invention relates to a multi-functional coating agent which can provide a substrate with weatherability (ultraviolet screening properties), harmful electromagnetic wave screening properties, resistance to chemicals, electrostatic discharge/charge preventive properties, mothproofing properties, and other properties when a substrate surface is coated with the coating agent and which is also superior in sealing properties, film formation properties and transparency.

2. Description of the Related Art

It has been heretofore known that to enhance the weatherability of resin substrate surfaces of a sealing material, a waterproof sheet, various interior/exterior building base materials, and the like, a resin itself is endowed with resistance to ultraviolet rays, acids and to alkalis, and a resin surface is treated with an organic solvent or the like to have hydrophilic/water-repellent nature, so that stainproof properties are given to the resin substrate surface. Moreover, it is known that an anti-fungus agent is mixed beforehand into a resin substrate in a place susceptible to fungi, or the anti-fungus agent is applied to the surface of the resin substrate, so that the resin substrate becomes fungi-resistant. However, many of the conventional methods have problems in that the weatherability has a life or effective components flow off with rainwater or the like. Furthermore, these methods cannot be applied to the already applied interior/exterior base building material or the like. Therefore, in some case, even re-applying of the entire material is necessary.

For materials of building interior/exterior members themselves, the progress of techniques about materials such as natural materials (stones, woods, sand), ceramic products (ceramics), and the like has developed materials whose weatherability and other properties are remarkably enhanced. As a result, the life duration of a building is prolonged, while maintenance cost can be saved.

Additionally, coating agents having various properties for use in various applications are well known, but a multi-functional coating agent which can impart weatherability (ultraviolet screening properties), harmful electromagnetic wave screening properties, resistance to chemicals, electrostatic discharge/charge preventive properties, mothproofing properties, and other properties and which is superior in sealing properties, film formation properties, and transparency has not been known.

Sealing and caulking materials which are filled in joints between members of a building base material, a machine/appliance, or the like for securing adhesive properties, watertightness, or hermetic properties of the members are indispensable in a modern architectural technique, and, for example, they play roles in joining finishing materials divided into units or absorbing a thermal displacement of the base building material or a building displacement by a disaster in the application process of an exterior material.

Besides sealing and caulking materials, functional materials, such as a waterproof sheet material, a waterproof coating material, a facing coat material needed to absorb displacement, expansion/contraction and deformation of an installation/application site or a building and materials adaptable to changes are needed. For the application of a natural lighting resin sheet material or other materials, a high weatherability and other properties are requested.

Examples of a functional material formed of an organic high-molecular weight material include silicone, metamorphic silicone, polysulfide, polyurethane, acrylic and other sealing materials, and recently these materials have been endowed with fungiproof, refractory and electrical conductive properties. Examples of basic performances required for these many sealing materials include the adhesive properties to sites/members, the durability of resin especially on surfaces and the securing of building's resistance to dirt generated around the sealing materials.

Among the performances, the adhesive properties may be obtained by selecting the material in accordance with the configuration and dimension of the joint and the types of members and by solving problems at time of application. Problems lie in the durability and the dirt resistance. For the durability, it is important to prevent resin from being deteriorated by ultraviolet rays, ozone, moisture, fungi, acids, alkalis, and the like which contact the surface of the sealing material resin. Moreover, the dirt resistance is one of the most important problems in respect of the building appearance.

The silicone (organopolysiloxane) sealing material is well known to catch dust and dirt in the atmospheric air by static electricity generated while silicon molecules in the sealing material shift to the periphery, and the surface of the sealing material frequently becomes black/dirty. Moreover, for an oil caulking material, its oil content collects dust and dirt on the surface to impair the building appearance and to increase the maintenance cost. Furthermore, a problem has been pointed out that fungi are generated in indoor/outdoor humid places and around water facilities to cause blackening or deterioration.

An object of the present invention is to provide a multi-functional coating agent which can provide a substrate with weatherability (ultraviolet screening properties), harmful electromagnetic wave screening properties, resistance to chemicals, electrostatic discharge/charge preventive properties, mothproofing properties, and other properties and which is also superior in sealing properties, film formation properties and transparency.

For enhancement in durability of the resin itself, recently, development of a silicone or fluoroplastic material has progressed, but a satisfactory material has not been developed in respect of the matching with members, applicability, economy, and the like. Especially, in order to protect a surface layer exposed to outside air from bad environmental conditions such as ultraviolet rays, acids/alkalis, ozone, and the like, a coating agent is necessary to protect a surface of a sealing material, a waterproof material, a sheet material or other base materials. When the coating layer of the agent has such properties as protecting the base material from bad environmental conditions, enhancing the durability of a base material including the sealing material or the like, and having stainproof properties and a function of blocking or decomposing oil and solvent eluted from the inside of the base material, the coating layer can be satisfactory as a surface protective layer for such base materials as the sealing material, the waterproof material, the sheet material, the organic high-molecular interior/exterior material or the like.

SUMMARY OF THE INVENTION

The present inventors have intensively investigated trying to achieve the above-mentioned objects, and as a result, have found that a coating agent containing an amorphous type titanium oxide can impart remarkably superior weatherability (ultraviolet screening properties), harmful electromagnetic wave screening properties, resistance to chemicals, electrostatic discharge/charge preventive properties, mothproofing properties, and other properties and that it is also superior in sealing properties, film formation properties and transparency, to complete the present invention.

That is, the present invention relates to a coating agent containing an amorphous type titanium oxide such as an amorphous type titanium peroxide sol, and to an ultraviolet screening material or a base building material which is characterized by coating its substrate with a coating agent containing an amorphous type titanium oxide such as an amorphous type titanium peroxide sol.

In the present invention, examples of the amorphous type titanium oxide include an amorphous type titanium peroxide $Tio_3$ and an amorphous type titanium oxide $TiO_2$. The amorphous type titanium peroxide or the amorphous type titanium oxide substantially has no photocatalyst function, unlike an anatase type titanium oxide $TiO_2$ and a rutile type titanium oxide $TiO_2$.

For the amorphous type titanium peroxide for use in the present invention, for example, an especially preferable amorphous type titanium peroxide sol can be manufactured as follows: aqueous ammonium or an alkali hydroxide such as a sodium hydroxide is added to a solution containing titanium in the titanic state, such as titanium tetrachloride $TiCl_4$. A resultant lightly bluish while, non-crystalline formless titanium hydroxide $Ti(OH)_4$ is also called orthotitanic acid $H_4TiO_4$. After washing and separation, the titanium hydroxide is treated with aqueous hydrogen peroxide to obtain a titanium peroxide solution in an amorphous state according to the present invention. The amorphous type titanium peroxide sol has a pH of 6.0 to 7.0 and a particle diameter of 8 to 20 nm, its appearance is a yellow transparent solution, and it is stable even if preserved at ordinary temperature for a long time. Moreover, a sol concentration is usually adjusted to 1.40 to 1.60%, but the concentration can be adjusted as the need arises. When the sol is to be used at a low concentration, it can be diluted by distilled water or the like.

Moreover, this amorphous type titanium peroxide sol is in an amorphous state at ordinary temperature and it is not crystallized yet into an anatase type titanium oxide, so that it has excellent adhesive properties and high film formation properties. Moreover, a uniform flat thin film can be formed therefrom, and its dry film is not dissolved in water.

Additionally, when an amorphous type titanium peroxide sol is heated at 100° C. or higher, it begins to be transformed into an anatase type titanium oxide sol, and in addition, when a substrate coated with the amorphous type titanium peroxide sol and then dried and fixed is heated at 250° or higher, the anatase type titanium oxide is obtained.

As the amorphous type titanium oxide for use in the present invention, known is a powdered state, or a sol state which is obtained by dispersing/suspending the powder in a solvent of nitric acid or the like. When the amorphous type titanium oxide having no photocatalyst function is used in the powder state, for example, a binder of a thermosetting water-soluble resin or the like is mixed therewith for use.

As the substrate to which the coating material of the present invention is applied, inorganic materials such as ceramic, glass, and the like, organic high-molecular resins such as a plastic plate, a chemical fiber, and the like, organic materials such as rubber, wood, paper, and the like, and metal materials such as aluminum, steel, and the like may be used. Moreover, its size and configuration are not limited: plate, honeycomb, fibrous, filter sheet, bead, and foamed configurations or the integrated configurations may be used.

A specific application example of the coating agent of the present invention will next be described. As methods for coating the substrate with the coating agent of the present invention, there are a sol/gel method, and a method in which a thin film is formed by sputtering, flame spraying, dipping, spin coating, spray coating or another process. Moreover, the thickness of the coating layer is determined by the thickness for achieving the ultraviolet screening or another purpose or for the film formation performance, but, for example, in the case of coating titanium peroxide sol, the thickness to cut ultraviolet rays is in the range of 0.5 $\mu$m to 1.0 $\mu$m or more.

When such an organic high-molecular resin plate such as a natural lighting acrylic plate, a polycarbonate plate, or the likes, is coated with the coating agent of the present invention, ultraviolet rays (400 nm or shorter) can be completely cut (intercepted), and excellent weatherability can be provided. The coating agent of the present invention not only can absorb ultraviolet rays to prevent the lower layer of organic high-molecular resin from being deteriorated by ultraviolet rays but also can be applied to an organic high-molecular resin plate or the like using an organic pigment/dye which has not been used previously because of a problem of color fading. Moreover, since the coating agent of the present invention has no photocatalyst function, the organic high-molecular resin plate or the like is not deteriorated by the photocatalyst action. Furthermore, since the coating agent of the present invention also has a resistance to acids, there is no deterioration by acid rain or the like.

When the surface of a silicone sealing material or an oil caulking material around a unit bath in a bathroom, around a window frame on an outer wall or between tiles is coated with the coating agent of the present invention, the electrostatic discharge/charge preventive action of the agent prevents dust and dirt in the atmospheric air from electrostatically sticking to the surface, so that the surface does not become black/dirty. Moreover, the oil content of the oil caulking material is prevented from being eluted onto the surface, no dust or dirt is caught by the oil, no fungi is generated, and the surface of the material is prevented from being blackened or deteriorated. Furthermore, since the coating agent of the present invention has water-proof and hermetic functions and is superior in film formation properties, the effect described above is not deteriorated even after long term use. As aforementioned, the use of the coating agent of the present invention having even the weatherability allows a silicone resin sealing material or a metamorphic silicone resin caulking material to be used outdoors.

In addition, when a TV cathode-ray tube or a display surface of a personal computer or other OA equipment is coated with the coating agent of the present invention, harmful electromagnetic waves of specific wavelengths can be completely cut (intercepted). Moreover, by mixing/combining presently used raw materials of electromagnetic wave shield or fine particles of active carbon, electromagnetic waves of specific wavelengths can be cut. Furthermore, woven fabric, non-woven fabric, or the like coated with the coating agent of the present invention fails to be electrostatically charged or discharge static electricity even in a winter when air is dry. Since the fabric also has a resistance to chemicals, it can be applied to plant uniforms and the like, and a mothproofing agent is advantageously unnecessary for storage.

Besides the amorphous type titanium oxide according to the present invention, dielectric and conductive ceramic materials have the screening function of ultraviolet rays or the like and the static electricity generation preventive function. The dielectric ceramic materials include $SiO_2$, $Ta_2O_5$, $TiO_2$, $SrTiO_3$, $BaTiO_3$, and perovskite compounds in Pb system. Moreover, the conductive ceramic materials include alloys composed of base metals such as copper, nickel, chromium, titanium and aluminum. These ceramic materials are used also as ultraviolet cutting cosmetics or coating resin mixed materials in the state of fine particles or a fine powder having a diameter of about 0.001 μm to 20 μm. The coating agent of the present invention can contain these ceramic materials together with the amorphous type titanium oxide if necessary.

Among these ceramic materials, as a material having a photocatalyst function, a microfine powder of anatase type titanium oxide with a particle diameter of 7 nm to 20 nm or a sol containing the microfine powder is on the market as "ST-01" (made by ISHIHARA TECHNO CORPORATION) or "SST-01" (made by ISHIHARA TECHNO CORPORATION can be used). When the material having a photocatalyst function is directly coated on such an organic high-molecular resin substrate as the sealing material, the waterproof material, the sheet material or the like, the material deteriorates the substrate. Therefore, layers need to be formed via an intermediate layer, but if an ultraviolet screening layer is composed of the material having the photocatalyst function such as the anatase type titanium oxide with a thickness of about 0.5 μm to 1.0 μm, the layer is effective as a protective layer having weatherability and resistance to chemicals. Moreover, the layer also functions as a stainproof layer because floating oil dust or another pollutant can be decomposed by the layer. Additionally, the intermediate layer for protecting the base material from the photocatalyst function may be an about 0.5 μm to 1.0 μm thick layer of silicon compound, e.g., silicon oxide such as colloidal silica, water-glass, or the like, a layer of an amorphous type titanium oxide having no photocatalyst function, such as an amorphous type titanium oxide or an amorphous type titanium peroxide, or a layer containing both the silicon oxide and the amorphous type titanium oxide.

Moreover, the substrate which is coated with such silicon oxide as the colloidal silica or the like, mixed with the amorphous type titanium oxide has a hydrophilic nature on its surface in addition to the ultraviolet screening function, and is provided with a self-cleaning action for hydrophilic-cleaning of deposits on the surface. Furthermore, if the anatase type titanium oxide or the rutile type titanium oxide is blended/mixed, in addition to the aforementioned functions, the photocatalyst function can be provided.

DESCRIPTION OF THE PREFERRED EMBODIMENTS

Next, the present invention will be described in more detail in accordance with examples, but the technical scope of the present invention is not limited by these examples.

REFERENCE EXAMPLE 1

Manufacture of Amorphous Type Titanium Peroxide Sol

A 50% titanium tetrachloride $TiCl_4$ solution (by SUMITOMO SITX Co.) diluted 70 times with distilled water, and a 25% ammonium hydroxide $NH_4OH$ solution (by TAKASUGI PURECHEMICAL INDUSTRY Ltd.) diluted 10 times with distilled water were mixed with each other in a volume ratio 7:1, to carry out a neutralizing reaction. After the neutralizing reaction, pH was adjusted to 6.5 to 6.8, the mixture was allowed to stand for a while, and a supernatant liquid was thrown away. To the remaining $Ti(OH)_4$ gel, distilled water was added in an amount about four times as much as the amount of the gel, and the solution was sufficiently stirred and then allowed to stand. Water washing was repeated until no chlorine ion in a supernatant liquid was detected when checked with silver chloride, and finally, the supernatant liquid was thrown away to leave a precipitant alone. In a certain case, a dewatering treatment can be carried out by a centrifugal separator. Afterward, 210 ml of a 35% aqueous hydrogen peroxide solution was divided into two portions, which were separately added every 30 minutes to 3600 ml of the lightly bluish white $Ti(OH)_4$, and the solution was then stirred overnight at about 5° C. to obtain about 2500 ml of an yellow transparent amorphous type titanium peroxide sol.

Incidentally, it is preferable that the generation of heat be restrained in all the steps mentioned above, because a water-insoluble substance such as metatitanic said might be precipitated unless the heat generation is restrained.

EXAMPLE 1

Ultraviolet Radiation Screening Effect

Surfaces of transparent acrylic plates each having a size of 50×100 mm and a thickness of 2 mm were coated with the amorphous type titanium peroxide sol (containing 1.7% by weight of $TiO_3$) prepared according to the reference example by a dipping method to form coating layers with thickness of 1 μm and 0.5 μm. The surface of another acrylic plate was not coated with the amorphous type titanium peroxide sol to form a control substrate. In this manner, three types of test substrates were prepared.

Moreover, Scolt tile manufactured by TOTO Ltd. (photocatalyst tile) having a size of 30×30 mm with silver nitrate applied on its surface was prepared as a substrate sensitive to ultraviolet rays, and two black lamps each emitting a short-wavelength wave of 380 nm were prepared as ultraviolet sources.

The test substrate was fixed in a position 10 mm above the silver nitrate applied surface of the ultraviolet sensitive substrate, two black-light rays were radiated from a position 60 mm above the test substrate for one hour, and the ultraviolet shielding effect was confirmed by discoloration of the silver nitrate applied surface caused by chemical change.

As a result, for the test substrate which was formed by coating the surface of the acrylic plate with the amorphous type titanium peroxide sol to have a coating thickness of 1 μm, no change was observed on the surface of the ultraviolet sensitive substrate, and it was confirmed that ultraviolet rays were completely cut off. For the test substrate similarly coated to have a coating thickness of 0.5 μm, its color was changed to a light gray one hour after radiation, and it was confirmed that a small amount of ultraviolet radiation was transmitted. For the test (control) substrate having the acrylic plate surface not coated with the amorphous type titanium peroxide sol, it was confirmed that discoloration started 30 minutes after ultraviolet radiation, and the surface of the ultraviolet sensitive substrate was changed to a dark gray by chemical change of the silver nitrate applied surface one hour after radiation.

EXAMPLE 2

The test was performed in the same manner, except that instead of the amorphous type titanium peroxide sol of $TiO_3$, a coating agent composed of amorphous type titanium oxide powder (manufactured by Idemitsu Kosan Co. Ltd.) and a thermosetting water-soluble resin as a powder binder, and almost the same results were obtained.

INDUSTRIAL APPLICABILITY

The multi-functional coating agent of the present invention is superior in sealing properties, film formation properties and transparency, and can provide the substrate with weatherability (ultraviolet screening properties), harmful electromagnetic wave screening properties, resistance to chemicals, electrostatic discharge/charge preventive properties, mothproofing properties and other properties when the surface of the substrate is coated with the coating agent.

What is claimed is:

1. A coating agent, comprising amorphous titanium peroxide.

2. The coating agent according to claim 1, further comprising at least one ceramic material which is one of dielectric or conductive.

3. The coating agent according to claim 2, wherein the at least one ceramic material is a dielectric material selected from the group consisting of $SiO_2$, $Ta_2O_5$, $TiO_2$, $SrTiO_3$, $BaTiO_3$, and perovskite compounds in a Pb system.

4. The coating agent according to claim 2, wherein the at least one ceramic material is a conductive material which is at least one alloy having a base metal selected from the group consisting of copper, nickel, chromium, titanium, and aluminum.

5. The coating agent according to claim 1, wherein the amorphous titanium peroxide has substantially no photocatalyst property.

6. A coating agent, comprising amorphous titanium peroxide which is a sol.

7. The coating agent according to claim 6, wherein the sol has a pH ranging from 6.0 to 7.0.

8. The coating agent according to claim 6, wherein the amorphous titanium peroxide is present as particles having a diameter ranging from 8 to 20 nm.

9. The coating agent according to claim 6, wherein the amorphous titanium peroxide includes titanium in an amount ranging from 1.40 to 1.60% by weight.

10. The coating agent according to claim 6, wherein the sol has an appearance of a yellow transparent solution.

11. A coated substrate, comprising:
a substrate; and
a coating provided on at least one surface of the substrate and comprised of the coating agent according to claims 1 or 6.

12. The coated substrate according to claim 11, wherein the coating further comprises a photocatalyst material, and wherein the coated substrate further comprises an intermediate layer provided between the substrate and the coating and having a thickness which is at least effective to reduce deterioration of the substrate which would otherwise occur due to the presence of the photocatalyst material.

13. The coated substrate according to claim 12, wherein the intermediate layer is comprised of a material selected from the group consisting of a silicon compound, an amorphous titanium oxide having no photocatalyst property, an amorphous titanium peroxide having no photocatalyst property, and mixtures thereof.

14. The coated substrate according to claim 12, wherein the intermediate layer has a thickness ranging from about 0.5 to about 1.0 $\mu$m.

15. The coated substrate according to claim 11, wherein the substrate is selected from the group consisting of a sealing material, a caulking material, a ceramic, a glass, an organic high molecular weight resin, a rubber, a fabric, wood, and paper.

16. A coated building material, comprising:
a building material; and
a coating provided on at least one surface of the building material and comprised of the coating agent according to claims 1 or 6.

17. An ultraviolet shielding material, comprising:
a substrate; and
a coating provided on at least one surface of the substrate and comprised of the coating agent according to claims 1 or 6.

18. The ultraviolet shielding material according to claim 17, wherein the coating further comprises a photocatalyst material, and wherein the coated substrate further comprises an intermediate layer provided between the substrate and the coating.

19. The ultraviolet shielding material according to claim 18, wherein the intermediate layer is comprised of a material selected from the group consisting of a silicon compound, an amorphous titanium oxide having no photocatalyst property, an amorphous titanium peroxide, and mixtures thereof.

20. The ultraviolet shielding material according to claim 18, wherein the intermediate layer has a thickness ranging from about 0.5 to about 1.0 $\mu$m.

* * * * *